United States Patent [19]
Chan et al.

[11] Patent Number: 4,789,327
[45] Date of Patent: Dec. 6, 1988

[54] ADJUSTABLE PIPE EXTRUSION DIE WITH INTERNAL COOLING

[76] Inventors: Harry Chan, 89 Larkin Ave., Markham, Ontario, Canada, L3P 4R1; Basilio Yi, 35 Hoover Dr., Thornhill, Ontario, Canada, L3T 5M6

[21] Appl. No.: 160,245

[22] Filed: Feb. 25, 1988

[51] Int. Cl.⁴ .............................................. A21C 3/00
[52] U.S. Cl. ................... 425/133.1; 425/549; 425/552; 425/403; 425/463; 425/466
[58] Field of Search ................. 425/131.1, 133.1, 526, 425/535, 538, 549, 552, 557, 396, 403, 463, 466, 467

[56] References Cited

U.S. PATENT DOCUMENTS

| | | | |
|---|---|---|---|
| 3,241,503 | 3/1966 | Schafer | 425/133.1 |
| 3,907,961 | 9/1975 | Carrow | 264/314 |
| 4,182,603 | 1/1980 | Knittel | 425/133.1 |
| 4,305,703 | 12/1981 | Lupke et al. | 425/133.1 |
| 4,500,284 | 2/1985 | Lupke | 425/511 |
| 4,510,013 | 4/1985 | Lupke | 156/498 |
| 4,522,775 | 6/1985 | Briggs et al. | 425/133.1 |
| 4,578,025 | 3/1986 | Ando et al. | 425/133.1 |

FOREIGN PATENT DOCUMENTS

1025834  1/1983  France ........................... 425/131.1

*Primary Examiner*—Bernard Nozick

[57] ABSTRACT

An extrusion die, particularly for double-walled thermoplastic pipes, includes an extrusion head, a nozzle, two concentric hollow mandrels carrying die lips and an additional cooling mandrel. The lips have threaded adjusting members to vary the sizes of the die gaps, the lips for the inner wall being provided with electrical heaters. The concentric mandrels have a spider with members for its radial adjustment. The cooling mandrel has substantially annular channels for a coolant, comunicating with each other by means of a sharply skewed opening and combined into a number of sections to control intensity of heat exchange.

11 Claims, 1 Drawing Sheet

4,789,327

ADJUSTABLE PIPE EXTRUSION DIE WITH INTERNAL COOLING

BACKGROUND OF THE INVENTION

This invention relates to extrusion dies for apparata producing seamless thermoplastic tubings, single-walled and double-walled. Particularly, the present die is adapted for an apparatus producing pipes with a smooth inner wall and a corrugated outer wall.

Known dies of such a type for single walled pipes (for example, U.S. Pat. No. 3,907,961) include the following components:

an extrusion head having a central bore with an opening for receiving an extrudate of a thermoplastic material under pressure therefrom;

a nozzle attached to said head and carrying an outer die lip on a free end of the nozzle;

a mandrel placed in said bore in a substantially coaxial relation with and spaced from the nozzle to provide a thermoplastic conducting passage extending in the longitudinal direction thereof for the delivery of the extrudate to the delivery end thereof carrying an inner die lip defining with the outer die lip an annular extrusion orifice of diminishing interior dimensions, through which the extrudate can flow uninterruptedly and form the tubing.

In addition to the above components, known dies for double-walled pipes (for example, U.S. Pat. No. 4,510,013) include another opening for the second extrudate, and a second hollow mandrel placed within the first one in a substantially coaxial relation with and spaced from the first mandrel to provide the second thermoplastic conducting passage extending in the longitudinal direction thereof for the delivery of the second extrudate to the delivery end thereof carrying a second inner die lip defining with the second outer die lip the second annular extrusion orifice of diminishing interior dimensions, through which the second extrudate can flow uninterruptedly and form the inner wall.

Also, the known dies are provided with internal cooling which is particularly important for the double-walled corrugated pipes, wherein the outer wall is set by a corrugator, and the inner wall is set internally by an additional mandrel mounted coaxially with the hollow mandrel, downstream thereof, for urging the tubing outwardly and extracting heat from the latter by means of a plurality of channels cooling an outer surface of the additional mandrel receiving the tubing from the extrusion orifice, said channels being connected to a coolant discharge and a coolant supply located exteriorly of the tubing and communicating with said channels through the hollow mandrel.

The known dies have following disadvantages. They do not allow to vary the wall thickness of the tubing and to center the extrusion orifices. Also, the protruding second mandrel of the die for double-wall pipes lacks a support at its free end, the second extrudate having loss of heat in the second thermoplastic conducting passage.

Still another disadvantage of the known dies lies in having helical channels for coolant in the additional cooling mandrel, the lateral surface of the pipe being cooled helically. This effect causes stresses in the annular cross-sections of the pipe.

Finally, said channels constitute only one cooling circuit not allowing to control properly the heat exchange between the cooling mandrel and the inner surface of the pipe.

SUMMARY OF THE INVENTION

The objective of the present invention is to overcome the above drawbacks of the known dies.

This objective is achieved by means of that the die is supplied with following components:

threaded adjusting members to adjust the inner die lips longitudinally, effective to vary the sizes of the extrusion orifices when the lips are axially adjusted;

a threaded adjusting member to adjust the outer die lip longitudinally, effective to vary the size of the extrusion orifice when the lip is axially adjusted;

a spider supporting the second mandrel within the first mandrel and mounted beyond the first extrusion orifice, the spider constituting an inner ring disposed on the second mandrel and an outer ring attached to the inner ring by a plurality of spider legs and placed within the first mandrel;

electrical heaters for the second extrusion orifice to heat the second extrudate as the latter exits the second die lips, thus increasing the viscosity of the extrudate and reducing its shear stress to prevent the fracture of the second ply.

Other distinguishing features are as follows:

the adjusting member for the outer die lip constitutes a flange mounted on the nozzle and having longitudinally disposed screws located on the flange circumferentially and moving the outer die lip axially when the latter is axially adjusted;

the second outer die lip has a flange with longitudinally disposed screws located on the flange circumferentially and screwed into a face of the outer ring;

said heaters are incorporated inside the second inner die lip and around the first mandrel near the second outer die lip;

the cooling channels are substantially annular, the adjacent channels communicating with each other by means of a sharply skewed opening;

between the channels, one of which is axially most remote from and one of which is axially most close to the extrusion orifice, there are at least two adjacent channels not communicating with each other and connected to the coolant discharge and the coolant supply independently to divide all the channels into a number of sections connected to the coolant discharge and the coolant supply independently and ensuring possibility to vary the intensity of the heat exchange of the different sections.

It should be noted inter alia that the flange design of the nozzle and outer die lip eliminates problems associated with leaks and set-up of the extrudate in the gaps between these details in conventional designs.

A more complete appreciation of the present invention and the distinguishing characteristics, objectives and attendant advantages thereof set out herein is more apparent and obvious to the ordinary skilled in the art from the following detailed description, drawings and appended claims.

DESCRIPTION OF THE PREFERRED EMBODIMENTS

Referring now to the drawings wherein like reference characters assignate like or corresponding parts throughout the several views, the extrusion die of the present invention for an apparatus producing two-ply seamless plastic tubing includes and extrusion head 2, an elongate nozzle 3, a first hollow mandrel 4, a second hollow mandrel 5 and an additional cooling mandrel.

The extrusion head 2 has a central bore with a lateral opening 6 for fluid communication with a first extruder means (not shown) and for receiving a first extrudate of a first thermoplastic material under pressure therefrom. The head 2 is provided with an electrical heater 7 and thermal sensors (not shown).

The nozzle 3 has a flange 8 in its receiving end for clamping the nozzle to the head 2 by means of a ring 9 with screws 10 disposed circumferentially around the flange 8.

To mount the nozzle 3 uniformly spaced around the first mandrel 4, the head 2 is provided with centering screws 11 disposed radially in the head, interacting with the lateral surface of the flange 8 and permitting thus the radial adjustment of the nozzle 3 with respect to the mandrel 4.

The free end of the nozzle 3 has a thread for a flange 12 and a lateral surface for a first outer die lip 13 fixed to the flange 12 by longitudinally disposed screws 14 located on the latter circumferentially.

The nozzle 3 is provided with an electrical heater 16.

The first mandrel 4 is placed in the bore of the head 2 in a substantially coaxial relation with and spaced from the nozzle 3 to provide a first thermoplastic conducting passage extending in the longitudinal direction thereof for the delivery of the first extrudate to the delivery end thereof. The mandrel 4 is clamped to a face of the head 2 by means of a broad flange 17 with screws 18 circumferentially disposed in the flange. The latter is provided with an electrical heater 19 and a lateral opening 21 for fluid communication with a second extruder means (not shown) and for receiving a second extrudate of a second thermoplastic material under pressure therefrom.

The second mandrel 5 is placed within the first mandrel 4 in a substantially coaxial relation with and spaced from the latter to provide a second thermoplastic conducting passage extending in the longitudinal direction thereof for the delivery of the second extrudate to the delivery end thereof. The mandrel 5 is clamped to a face of the flange 17 by means of a flange 22 and circumferentially disposed screws 23.

The lateral surfaces of the mandrels 4 and 5 have curved slots 24 and 26 accordingly to which the openings 6 and 21 are tangential to provide gradual transitions to the plastic conducting passages.

Figures 1, 2, 3, 4:
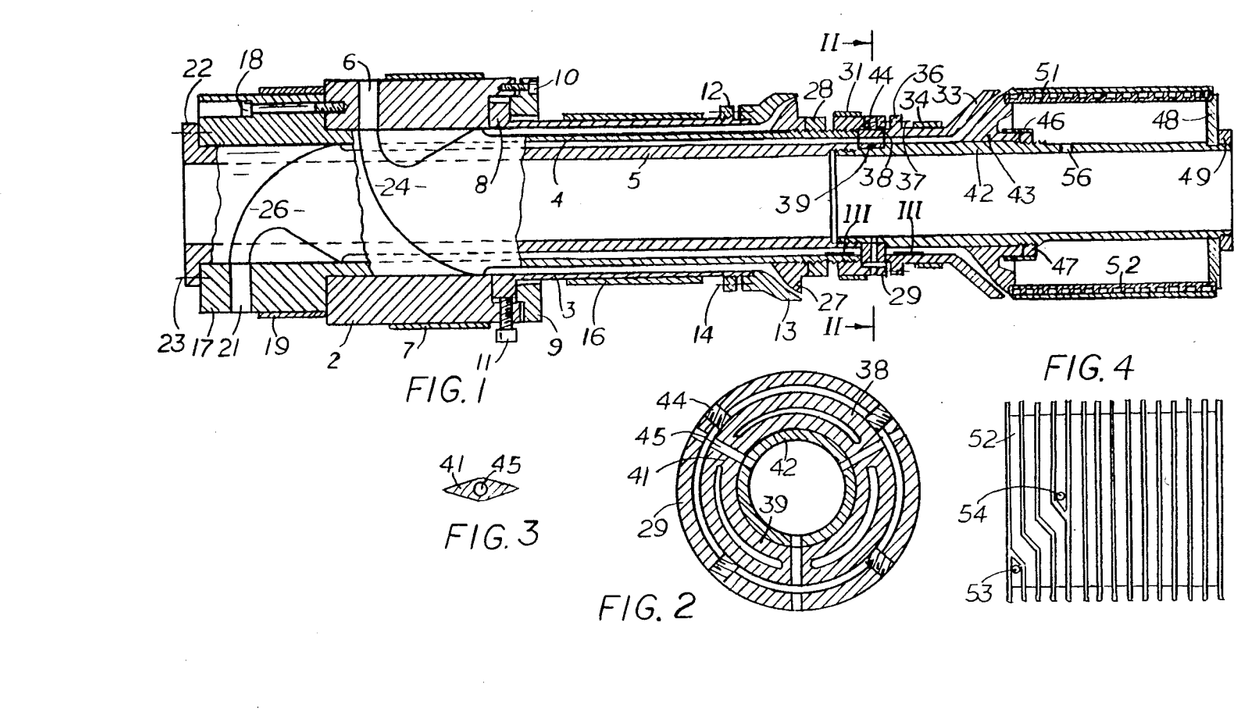
FIG. 1 is a longitudinal section of the present die.
FIG. 2 is a cross-sectional elevation taken along line II—II of FIG. 1.
FIG. 3 is a cross-sectional elevation (of a spider leg) taken along line III—III of FIG. 1.
FIG. 4 is a general view of an inner tube of a cooling mandrel with annular channels.

The delivery end of the mandrel 4 has a thread for fastening a first inner die lip 27 with a nut 28 and an internally threaded housing 29 carrying an electrical heater 31, a spider and a second outer die lip 33. The latter has an electrical heater 34 and a flange 36 fastened to a face of the housing 29 by means of circumferential screws 37 clamping also an outer ring 38 of the spider. Its inner ring 39 attached to the ring 38 by means of a plurality of spider legs 41 is clamped between the delivery end of the mandrel 5 and an extension 42 carrying a second inner die lip 43 and the additional cooling mandrel. In FIG. 1 the extension 42 is shown screwed into the mandrel 5.

The spider is mounted uniformly spaced within the housing 29 by means of screws 44 radially disposed in the latter (in FIG. 1 one of the screws 44 is conditionally shown in the plane of the drawing). The screws 44 interact with the lateral surface of the ring 38 and permit the radial adjustment of the lip 43 with respect to the lip 33.

The legs 41 are radial and double-edged with passages 45 for communication lines of heaters and sensors and for supplying a compressed air (in a blow-molding process). The communication lines and air pipes passing through the cavity of the hollow mandrel 5 are not shown in the drawings.

The lip 43 has an electrical heater 46, is fastened to the extension 42 by means of a nut 47 and carries one end of the additional cooling mandrel. Its second end is supported on the extension 42 by means of a disk 48 fastened to the latter by a nut 49.

The cooling mandrel comprises a smooth outer sleeve 51 sheathing a grooved tube 52. The grooves are substantially annular and form channels communicating with each other by means of a sharply skewed opening. The channels are divided into a number of sections connected to a coolant discharge and a coolant supply independently. Said discharge and supply are located exteriorly of the die with their lines passing through the cavity of the mandrel 5 (not shown in the drawings).

The skewed openings of one section are circumferentially spaced apart from each other. That is why in FIG. 4 only the openings of the first section with a supply orifice 53 and a discharge orifice 54 are seen in the plane of the drawing.

The extension 42 has at least one opening 56 for the coolant lines (not shown).

For production of corrugated tubing, the nozzle and mandrels of the die are placed in a tubular mold cavity formed by a series of forwardly moving molds described, for example, in already mentioned U.S. Pat. No. 4,510,013 (the molds are not shown in the drawings).

In operation, the extrudates of the expandable thermoplastic materials flow from the extruders uninterruptedly through the passages between the nozzle 3, mandrels 4 and 5. In the blow molding mode, pressurized air is introduced through the passages 45 to the interior of the formed outer parison (not shown) conforming to the wall of the tubular mold cavity under the air pressure. The additional mandrel receives the formed inner parison, urges the tubing outwardly and extracts the heat from the inner ply.

In the vacuum molding mode, the molds have channels communicating with a vacuum pump, the pressure in said interior being atmospheric or from an air pressure supply (combination blow-vacuum molding).

It is to be understood that the die described and presented for explanation is only exemplary. Various modifications may be obviously resorted to by those skilled in the art without departing from the spirit and the scope of the present invention as set forth in the appended claims.

We claim:

1. An extrusion die for an apparatus producing two-ply seamless thermoplastic tubing having concentric outer and inner plies, the die including:

an extrusion head having a central bore with (an) a radial inlet opening for receiving a first extrudate of a first thermoplastic material under pressure therefrom;

an elongate nozzle attached to said head and carrying a first hollow outer die lip on a free end of the nozzle;

a first hollow mandrel having (an) a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second hollow outer die lip;

a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;

the improvement wherein the mandrels are inserted into the inner die lips (are) provided with threaded adjusting members to adjust the lips longitudinally, effective to vary the sizes of the extrusion orifices when the lips are axially adjusted.

2. An extrusion die for an apparatus producing seamless thermoplastic tubing, the die including:

an extrusion head having a central bore with (an) a radial inlet opening for receiving an extrudate of a thermoplastic material under pressure therfrom;

a nozzle attached to said head and carrying (an) a hollow outer die lip on a free end of the nozzle;

a mandrel placed in said bore in a substantially coaxial relation with and spaced from the nozzle to provide between the latter and the mandrel a thermoplastic conducting passage extending in the longitudinal direction thereof for the delivery of the extrudate to the delivery end thereof carrying (an) a hollow inner die lip defining with the outer die lip an annular extrusion orifice of diminishing interior dimensions, through which the extrudate can flow uninterruptedly and form the tubing;

the improvement wherein the mandrel is inserted into the outer die lip provided with a threaded adjusting member to adjust the lip longitudinally, effective to vary the size of the extrusion orifice when the lip is axially adjusted.

3. The die of claim 2 wherein said adjusting member constitutes a flange mounted on the nozzle and having longitudinally disposed screws located on the flange circumferentially and moving the outer die lip axially when the latter is adjusted.

4. An extrusion die for an apparatus producing two-ply seamless thermoplastic tubing having concentric outer and inner plies, the die including:

an extrusion head having a central bore with (an) a radial inlet opening for receiving a first extrudate of a first thermoplastic material under pressure therefrom;

an elongate nozzle attached to said head and carrying a first hollow outer die lip on a free end of the nozzle;

a first hollow mandrel having (an) a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second outer die lip;

a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;

the improvement wherein the second mandrel is supported within the first mandrel by means of a spider mounted beyond the first extrusion orifice and constituting an inner ring disposed on the second mandrel and an outer ring attached to the inner ring by a plurality of spider legs and placed within the first mandrel.

5. The die of claim 4 wherein said spider has a centering means mounting the second inner lip uniformly spaced within the second outer lip by means of screws disposed in the first mandrel radially, interacting with the lateral surface of the outer ring and permitting the radial adjustment of the spider with respect to the first mandrel.

6. The die of claim 4 wherein the second outer die lip has a flange with longitudinally disposed screws located on the flange circumferentially and screwed into a face of the outer ring.

7. An extrusion die for an apparatus producing two-ply seamless thermoplastic tubing having concentric outer and inner plies, the die including:

an extrusion head having a central bore with (an) a radial inlet opening for receiving a first extrudate of a first thermoplastic material under pressure therefrom;

an elongate nozzle attached to said head and carrying a first hollow outer die lip on a free end of the nozzle;

a first hollow mandrel having (an) a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, trough which the first extrudate can flow uninterruptedly and form the outer ply, the first mandrel protruding beyond the nozzle and carrying farther a second hollow outer die lip;

a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;

the improvement wherein the second extrusion orifice is provided with electrical heaters to heat the second extrudate as the latter exits the second die lips, thus increasing the viscosity of the extrudate and reducing its shear stress to prevent the fracture of the second ply.

8. The die of claim 7 wherein said heaters are incorporated inside the second inner die lip.

9. The die of claim 7 wherein said heaters are incorporated around the first mandrel near the second outer die lip.

10. An extrusion die for an apparatus producing seamless thermoplastic tubing, the die including:
an extrusion head having a central bore with (an) a radial inlet opening for receiving an extrudate of a thermoplastic material under pressure therefrom;
a nozzle attached to said head and carrying (an) a hollow outer die lip on a free end of the nozzle;
a hollow mandrel placed in said bore in a substantially coaxial relation with and spaced from the nozzle to provide between the latter and the mandrel a thermoplastic conducting passage extending in the longitudinal direction therof for the delivery of the extrudate to the delivery end thereof carrying (an) a hollow inner die lip defining with the outer die lip the annular extrusion orifice of diminishing interior dimensions, through which the extrudate can flow uninterruptedly and form the tubing;
an additional mandrel mounted coaxially with the hollow mandrel, downstream thereof, for urging the tubing outwardly and extracting heat from the latter by means of a plurality of channels cooling an outer surface of the additional mandrel receiving the tubing from the extrusion orifice, said channels being connected to a coolant discharge and a coolant supply located exteriorly of the tubing and communicating with said channels through the hollow mandrel;
the improvement wherein said channels are substantially annular, the adjacent channels communicating with each other by means of a sharply skewed opening.

11. An extrusion die for an apparatus producing seamless thermoplastic tubing, the die including:
an extrusion head having a central bore with (an) a radial inlet opening for receiving an extrudate of a thermoplastic material under pressure therefrom;
a nozzle attached to said head and carrying (an) a hollow outer die lip on a free end of the nozzle;
a hollow mandrel placed in said bore in a substantially coaxial relation with and spaced from the nozzle to provide between the latter and the mandrel a thermoplastic conducting passage extending in the longitudinal direction therof for the delivery of the extrudate to the delivery end thereof carrying (an) a hollow inner die lip defining with the outer die lip the annular extrusion orifice of diminishing interior dimensions, through which the extrudate can flow uninterruptedly and form the tubing;
an additional mandrel mounted coaxially with the hollow mandrel, downstream thereof, for urging the tubing outwardly and extracting heat from the latter by means of a plurality of channels cooling an outer surface of the additional mandrel receiving the tubing from the extrusion orifice, said channels being connected to a coolant discharge and a coolant supply located exteriorly of the tubing and communicating with said channels through the hollow mandrel;
the improvement wherein between said channels, one of which is axially most remote from and one of which is axially most close to the extrusion orifice, there are at least two adjacent channels not communicating with each other and connected to the coolant discharge and the coolant supply independently to divide all said channels into a number of sections connected to the coolant discharge and the coolant supply independently and ensuring possibility to vary the intensity of the heat exchange of the different sections.

* * * * *

US004789327B1

REEXAMINATION CERTIFICATE (4120th)

United States Patent [19]
Chan et al.

[11] B1 4,789,327
[45] Certificate Issued Jul. 18, 2000

[54] ADJUSTABLE PIPE EXTRUSION DIE WITH INTERNAL COOLING

[75] Inventors: Harry Chan, Markham; Basilio Yi, Thornhill, both of Canada

[73] Assignee: Corma Inc., Concord, Canada

Reexamination Request:
No. 90/005,436, Jul. 28, 1999

Reexamination Certificate for:
Patent No.: 4,789,327
Issued: Dec. 6, 1988
Appl. No.: 07/160,245
Filed: Feb. 25, 1988

[51] Int. Cl.[7] .............................. A21C 3/00; B29C 47/22; B29C 47/26; B29C 47/86; B29C 47/88
[52] U.S. Cl. .................................... 425/133.1; 425/378.1; 425/381; 425/403; 425/463; 425/466; 425/549; 425/552
[58] Field of Search ............................... 425/131.1, 133.1, 425/526, 535, 538, 549, 552, 557, 378.1, 396, 403, 463, 466, 467, 381

[56] References Cited

U.S. PATENT DOCUMENTS

| 3,241,503 | 3/1966 | Schafer . |
| 3,907,961 | 9/1975 | Carrow . |
| 3,981,663 | 9/1976 | Lupke . |
| 4,182,603 | 1/1980 | Knittel . |
| 4,199,314 | 4/1980 | Lupke . |
| 4,305,703 | 12/1981 | Lupke et al. . |
| 4,500,284 | 2/1985 | Lupke . |
| 4,510,013 | 4/1985 | Lupke . |
| 4,522,775 | 6/1985 | Briggs et al. . |
| 4,578,025 | 3/1986 | Ando et al. . |
| 4,770,618 | 9/1988 | Lupke ................................. 425/133.1 |

FOREIGN PATENT DOCUMENTS

1025834   4/1953   France .

OTHER PUBLICATIONS

Fundamentals of the Design and Calculations of Plastic Details and the Equipment for their Manufacturing (In Russian), Leningrad, Mashinostroenie Publishing House, 1972, p. 397, FIG. XI.23.

Tadmor, Zehev and Gogos, Costas, Principles of Polymer Processing, New York, John Willey and Sons, p. 553, FIG. 13.22 (a) (reprinted from J.R. Syms, Computer Design Dies for Tubular Films, PIA Course on Accuracy in the Extrusion Process, Oct. 25, 1973).

*Primary Examiner*—Harold Pyon

[57] ABSTRACT

An extrusion die, particularly for double-walled thermoplastic pipes, includes an extrusion head, a nozzle, two concentric hollow mandrels carrying die lips and an additional cooling mandrel. The lips have threaded adjusting members to vary the sizes of the die gaps, the lips for the inner wall being provided with electrical heaters. The concentric mandrels have a spider with members for its radial adjustment. The cooling mandrel has substantially annular channels for a coolant, comunicating with each other by means of a sharply skewed opening and combined into a number of sections to control intensity of heat exchange.

B1 4,789,327

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4, 6, 7, 10 and 11 are determined to be patentable as amended.

Claims 5, 8 and 9, dependent on an amended claim, are determined to be patentable.

New claims 12–15 are added and determined to be patentable.

1. An extrusion die for an apparatus producing two-ply seamless thermoplastic tubing having concentric outer and inner plies, the die including:
   an extrusion head having a central bore with [(an)] *a* radial inlet opening for receiving a first extrudate of a first thermoplastic material under pressure therefrom;
   an elongate nozzle attached to said head and carrying a first hollow outer die lip on a free end of the nozzle;
   a first hollow mandrel having [(an)] *a* radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second hollow outer die lip;
   a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;
   the improvement wherein the mandrels [are] *inserted into the inner die lips* [(are)] are provided with threaded adjusting members to adjust the lips longitudinally, effective to vary the sizes of the extrusion orifices when the lips are axially adjusted.

2. An extrusion die for an apparatus producing seamless thermoplastic tubing, the die including:
   an extrusion head having a central bore with [(an)] *a* radial inlet opening for receiving an extrudate of a thermoplastic material under pressure therefrom;
   a nozzle attached to said head and carrying [(an)] *a* hollow outer die lip on a free end of the nozzle;
   a mandrel placed in said bore in a substantially coaxial relation with and spaced from the nozzle to provide between the latter and the mandrel a thermoplastic conducting passage extending in the longitudinal direction thereof for the delivery of the extrudate to the delivery end thereof carrying [(an)] *a* hollow inner die lip defining with the outer die lip an annular extrusion orifice of diminishing interior dimensions, through which the extrudate can flow uninterruptedly and form the tubing;
   the improvement wherein the mandrel is *provided with a hollow die lip on a free end of the mandrel adapted to receive and coaxially mount an additional mandrel therein where the mandrel and additional mandrel define a second thermoplastic conducting passage and where the mandrel* inserted into the outer die lip *of the nozzle is* provided with a threaded adjusting member to adjust the lip longitudinally, effective to vary the size of the extrusion orifice when the *outer die* lip is axially adjusted.

3. [The die of claim 2 wherein] *An extrusion die for an apparatus producing seamless thermoplastic tubing, the die including:*
   *an extrusion head having a central bore with a radial inlet opening for receiving an extrudate of a thermoplastic material under pressure therefrom;*
   *a nozzle attached to said head and carrying a hollow outer die lip on a free end of the nozzle;*
   *a mandrel placed in said bore in a substantially coaxial relation with and spaced from the nozzle to provide between the latter and the mandrel a thermoplastic conducting passage extending in the longitudinal direction thereof for the delivery of the extrudate to the delivery end thereof carrying a hollow inner die lip defining with the outer die lip an annular extrusion orifice of diminishing interior dimensions, through which the extrudate can flow uninterruptedly and form the tubing;*
   *the improvement wherein the mandrel is inserted into the outer die lip provided with a threaded adjusting member to adjust the lip longitudinally, where* said adjusting member constitutes a flange mounted on the nozzle and having longitudinally disposed screws located on the flange circumferentially and moving the outer die lip axially when the latter is adjusted.

4. An extrusion die for an apparatus producing two-ply seamless thermoplastic tubing having concentric outer and inner plies, the die including:
   an extrusion head having a central bore with [(an)] *a* radial inlet opening for receiving a first extrudate of a first thermoplastic material under pressure therefrom;
   an elongate nozzle attached to said head and carrying a first hollow outer die lip on a free end of the nozzle;
   a first hollow mandrel having [(an)] *a* radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second outer die lip;

a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof [for the delivery of the second extrudate to the delivery end thereof] carrying a second hollow inner die lip defining with the second outer die lip the second annular extrusion orifice of diminishing interior dimensions, through which the second extrudate can flow uninterruptedly and form the inner ply;

the improvement wherein the second mandrel is supported within the first mandrel by means of a spider mounted beyond the first extrusion orifice and constituting an inner ring disposed on the second mandrel and an outer ring attached to the inner ring by a plurality of spider legs and placed within the first mandrel *and electrical heaters being provided with said second extrusion orifice to heat the second extrudate to thereby reduce the shear stress of the second extrudate.*

6. [The die of claim 4] *An extrusion die for an apparatus producing two-ply seamless thermoplastic tubing having concentric outer and inner plies, the die including:*

*an extrusion head having a central bore with a radial inlet opening for receiving a first extrudate of a first thermoplastic material under pressure therefrom;*

*an elongate nozzle attached to said head and carrying a first hollow outer die lip on a free end of the nozzle;*

*a first hollow mandrel having a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second outer die lip;*

*a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;*

*the improvement wherein the second mandrel is supported within the first mandrel by means of a spider mounted beyond the first extrusion orifice and constituting an inner ring disposed on the second mandrel and an outer ring attached to the inner ring by a plurality of spider legs and placed within the first mandrel; and*

*wherein the second outer die lip has a flange with longitudinally disposed screws located on the flange circumferentially and screwed into a face of the outer ring for adjusting the lip longitudinally, effective to vary the size of the extrusion orifice when the lip is axially adjusted.*

7. An extrusion die for an apparatus producing two-ply seamless thermoplastic tubing having concentric outer and inner plies, the die including:

an extrusion head having a central bore with [(an)] a radial inlet opening for receiving a first extrudate of a first thermoplastic material under pressure therefrom;

an elongate nozzle attached to said head and carrying a first hollow outer die lip on a free end of the nozzle;

a first hollow mandrel having [(an)] a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, [trough] *through* which the first extrudate can flow uninterruptedly and form the outer ply, the first mandrel protruding beyond the nozzle and carrying farther a second hollow outer die lip;

a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;

the improvement wherein the second extrusion orifice is provided with electrical heaters to heat the second extrudate as the latter exits the second die lips, thus increasing the viscosity of the extrudate and reducing its shear stress to prevent the fracture of the second ply.

10. An extrusion die for an apparatus producing seamless thermoplastic tubing, the die including:

an extrusion head having a central bore with [(an)] a radial inlet opening for receiving an extrudate of a thermoplastic material under pressure therefrom;

a nozzle attached to said head and carrying [(an)] a hollow outer die lip on a free end of the nozzle;

a hollow mandrel placed in said bore in a substantially coaxial relation with and spaced from the nozzle to provide between the latter and the mandrel a thermoplastic conducting passage extending in the longitudinal direction thereof for the delivery of the extrudate to the delivery end thereof carrying [(an)] a hollow inner die lip defining with the outer die lip the annular extrusion orifice of diminishing interior dimensions, through which the extrudate can flow uninterruptedly and form the tubing;

an additional mandrel mounted coaxially with the hollow mandrel, downstream thereof, for urging the tubing outwardly and extracting heat from the latter by means of a plurality of channels cooling an outer surface of the additional mandrel receiving the tubing from the extrusion orifice, said channels being connected to a coolant discharge and a coolant supply located exteriorly of the tubing and communicating with said channels through the hollow mandrel;

the improvement wherein said channels are substantially annular, the adjacent channels communicating with each other by means of a sharply skewed opening.

11. An extrusion die for an apparatus producing seamless thermoplastic tubing, the die including:

an extrusion head having a central bore with [(an)] a radial inlet opening for receiving an extrudate of a thermoplastic material under pressure therefrom;

a nozzle attached to said head and carrying [(an)] a hollow outer die lip on a free end of the nozzle;

a hollow mandrel placed in said bore in a substantially coaxial relation with and spaced from the nozzle to provide between the latter and the mandrel a thermoplastic conducting passage extending in the longitudinal direction thereof for the delivery of the extrudate to the delivery end thereof carrying [(an)] a hollow inner die lip defining with the outer die lip the annular extrusion orifice of diminishing interior dimensions, through which the extrudate can flow uninterruptedly and form the tubing;

an additional mandrel mounted coaxially with the hollow mandrel, downstream thereof, for urging the tubing outwardly and extracting heat from the latter by means of a plurality of channels cooling an outer surface of the additional mandrel receiving the tubing from the extrusion orifice, said channels being connected to a coolant discharge and a coolant supply located exteriorly of the tubing and communicating with said channels through the hollow mandrel;

the improvement wherein between said channels, one of which is axially most remote from and one of which is axially most close to the extrusion orifice, there are at least two adjacent channels not communicating with each other and connected to the coolant discharge and the coolant supply independently to divide all said channels into a number of sections connected to the coolant discharge and the coolant supply independently and ensuring possibility to vary the intensity of the heat exchange of the different sections.

12. An extrusion die for an apparatus producing two-ply seamless thermoplastic tubing having concentric outer and inner plies, comprising:

an extrusion head having a central bore with a radial inlet opening for receiving a first extrudate of a first thermoplastic material under pressure therefrom;

an elongate nozzle attached to said head and carrying a first hollow outer die lip on a free end of the nozzle;

a first hollow mandrel having a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second hollow outer die lip;

a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;

wherein the first hollow mandrel supports the second mandrel and wherein the mandrels inserted into the inner die lips are provided with threaded adjusting members to adjust the lips longitudinally, effective to vary the sizes of the extrusion orifices when the lips are axially adjusted.

13. An extrusion die for an apparatus producing two-ply seamless thermoplastic tubing having concentric outer and inner plies, comprising:

an extrusion head having a central bore with a radial inlet opening for receiving a first extrudate of a first thermoplastic material under pressure therefrom;

an elongate nozzle attached to said head and carrying a first hollow outer die lip on a free end of the nozzle;

a first hollow mandrel having a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second hollow outer die lip;

a second hollow mandrel placed within the first mandrel in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply; and electrical heaters provided with the second extrusion orifice to heat the second extrudate as the latter exits the second die lips, thus increasing the viscosity of the extrudate and reducing its shear stress to prevent the fracture of the second ply;

wherein the mandrels inserted into the inner die lip are provided with threaded adjusting members to adjust the lips longitudinally, effective to vary the sizes of the extrusion orifices when the lips are axially adjusted.

14. An extrusion die for an apparatus producing two-ply seamless thermoplastic tubing having concentric outer and inner plies, the die including:

an extrusion head having a central bore with a radial inlet opening for receiving a first extrudate of a first thermoplastic material under pressure therefrom;

an elongate nozzle attached to said head and carrying a first hollow outer die lip on a free end of the nozzle;

a first hollow mandrel having a radial inlet opening for receiving a second extrudate of a second thermoplastic material under pressure therefrom, and placed in said bore in a substantially coaxial relation with and spaced from the nozzle to provide between the latter and the first mandrel a first thermoplastic conducting passage extending in the longitudinal direction thereof for the delivery of the first extrudate to the delivery end thereof carrying a first hollow inner die lip defining with the first outer die lip the first annular extrusion orifice of diminishing interior dimensions, through which the first extrudate can flow uninterruptedly and form the outer ply, the first mandrel protruding beyond the nozzle and carrying farther a second hollow outer die lip;

a second hollow mandrel placed within said first hollow mandrel, in a substantially coaxial relation with and spaced from the first mandrel to provide between the mandrels a second thermoplastic conducting passage extending in the longitudinal direction thereof for the delivery of the second extrudate to the delivery end thereof carrying a second hollow inner die lip defining with the second outer die lip the second annular extrusion orifice of diminishing interior dimensions, through which the second extrudate can flow uninterruptedly and form the inner ply;

an additional mandrel mounted coaxially with said second mandrel for urging the tubing outwardly and extracting heat from the latter by means of a plurality of channels cooling an outer surface of the additional mandrel receiving the tubing from the second extrusion orifice, said channels being connected to a coolant discharge and a coolant supply located exteriorly of the tubing and communicating with said channels through the second mandrel;

where said channels are substantially annular, the adjacent channels communicating with each other by means of a sharply skewed opening and where the mandrels inserted into the inner die lips are provided with threaded adjusting members to adjust the lips longitudinally, effective to vary the sizes of the extrusion orifices when the lips are axially adjusted.

15. An extrusion die for an apparatus producing seamless thermoplastic tubing, comprising:

an extrusion head having a central bore with a radial inlet opening for receiving an extrudate of a thermoplastic material under pressure therefrom;

a nozzle attached to said head and carrying a hollow outer die lip on a free end of the nozzle;

a first mandrel placed in said bore in a substantially coaxial relation with and spaced from the nozzle to provide between the latter and the first mandrel a thermoplastic conducting passage extending in the longitudinal direction thereof for the delivery of the extrudate to the delivery end thereof carrying a hollow inner die lip defining with the outer die lip, a first annular extrusion orifice of diminishing interior dimensions, through which the extrudate can flow uninterruptedly and form the tubing, the first mandrel protruding beyond the nozzle and carrying farther a second hollow outer die lip;

a second mandrel carrying an inner die lip, said second mandrel being placed in said bore in a substantially coaxial relation with and spaced from the first mandrel to provide between the latter and the second mandrel a thermoplastic conducting passage extending in the longitudinal direction thereof for the delivery of the extrudate, said outer die lip of said first mandrel and said inner die lip of said second mandrel defining a second annular extrusion orifice of diminishing interior dimensions, through which the extrudate can flow uninterruptedly and form the tubing;

wherein the first hollow mandrel supports the second mandrel and wherein the mandrels inserted into the inner die lips are provided with threaded adjusting members to adjust the lips longitudinally, effective to vary the respective sizes of said first and second extrusion orifices when the lips are axially adjusted.

* * * * *